E. A. BOSTROM.
ENGINE STARTER.
APPLICATION FILED JAN. 17, 1911.
1,032,584.  Patented July 16, 1912.
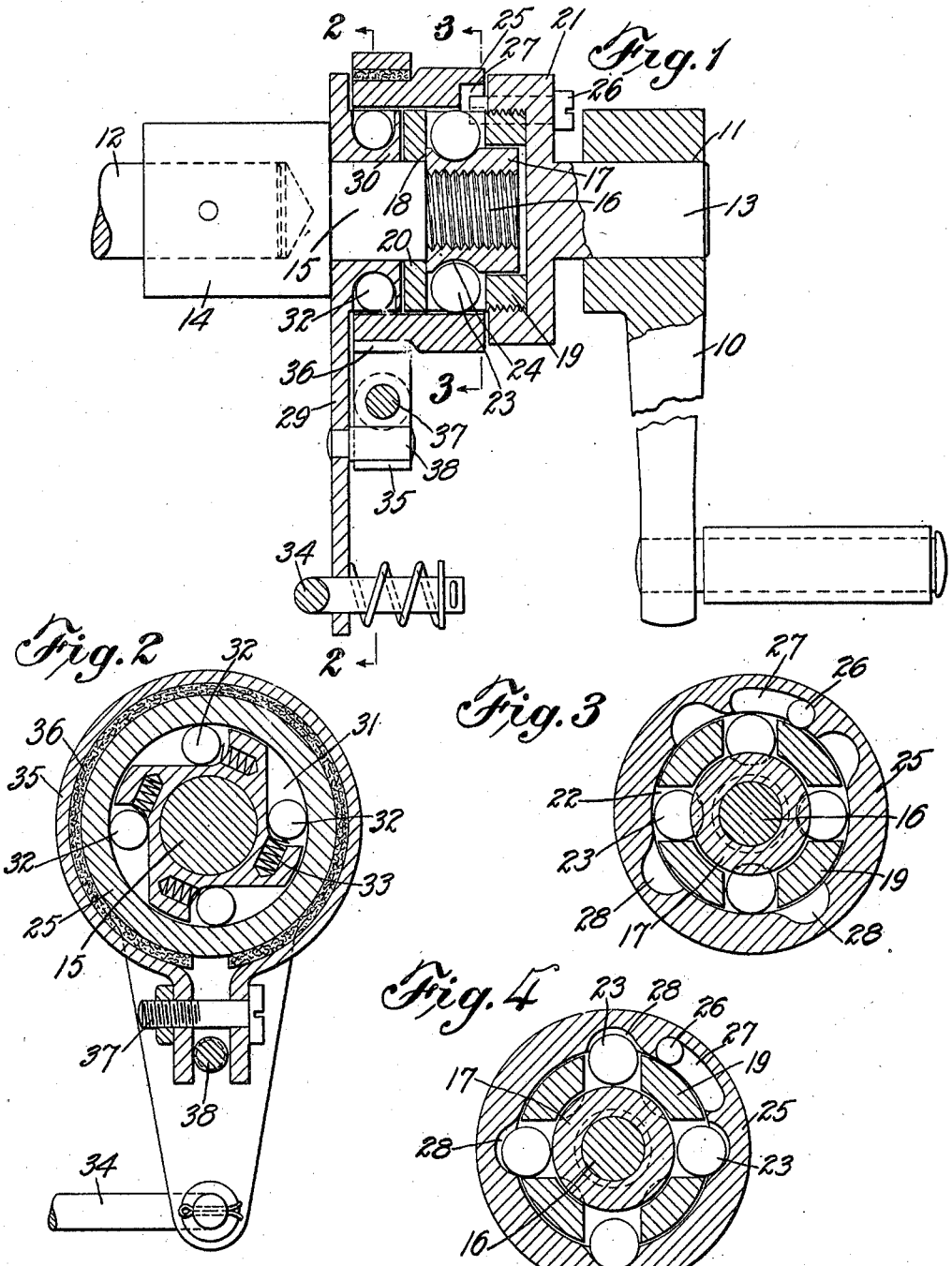

UNITED STATES PATENT OFFICE.

ERNST A. BOSTROM, OF ATLANTA, GEORGIA.

ENGINE-STARTER.

1,032,584.  Specification of Letters Patent.  Patented July 16, 1912.

Application filed January 17, 1911. Serial No. 603,134.

*To all whom it may concern:*

Be it known that I, ERNST A. BOSTROM, a citizen of the United States, and a resident of Atlanta, Fulton county, State of Georgia, have invented certain new and useful Improvements in Engine - Starters, of which the following is a full, clear, and exact specification, such as will enable others skilled in the art to which it appertains to make and use the same.

This invention relates to certain improvements in devices for use in starting internal combustion engines, and more particularly to a form of coupling for connecting the starting crank to the engine. The coupling is so designed that in case of back fire the crank will be released from the engine shaft and the former permitted to remain at rest instead of rotating with the shaft.

One of the main objects of my invention is to so design this coupling that it may be readily applied for connecting the ordinary crank now on the market directly to the shaft without involving any changes whatsoever in either the crank or the shaft.

A further object of my invention is to improve certain details of the coupling so that the coupling will be more positive in operation, more compact and less expensive and complicated to manufacture.

Various other objects and important features will be pointed out more particularly hereinafter.

Reference is to be had to the accompanying drawings forming a part of this specification and in which similar reference characters indicate corresponding parts in the several views and in which—

Figure 1 is a longitudinal section through a device constructed in accordance with my invention; Fig. 2 is a transverse section on the line 2—2 of Fig. 1; and Figs. 3 and 4 are sections on the line 3—3 of Fig. 1, Fig. 3 showing the parts in operative position for cranking, and Fig. 4 showing the parts in released position after a back fire.

In the accompanying drawing I have illustrated my invention as applied to an ordinary engine starting crank 10, which latter has a socket 11 for receiving a stem 12. This stem which I will hereinafter refer to as the shaft is usually not the engine shaft itself, but is usually connected with the engine shaft by a simple form of self-releasing clutch so that by turning the shaft 12 in one direction the engine will be caused to turn over, while as soon as the engine starts it will release itself from the shaft 12 and continue rotating leaving the shaft 12 at rest. The object of my construction is to release the crank from this shaft 12 in case the engine backs fire during starting and the shaft 12 starts rotating in the reverse direction. As commonly used, the crank 10 has been directly connected to the shaft 12 by securing the latter within the socket 11 of the crank. In my improved construction I remove the crank 10 from the shaft 12 and insert a coupling therebetween, which coupling presents a stem 13 similar to the shaft 12 and adapted to be secured within the socket 11 of the crank and a collar 14 having a socket corresponding to the socket 11 and adapted to receive the shaft or stem 12. The socket carrying member 14 has a spindle portion 15 of smaller diameter and in alinement with the shaft and beyond this spindle portion is a threaded portion 16 of still smaller diameter. Rigidly secured on this threaded portion 16 is a nut 17 of slightly larger external diameter and the spindle portion 15. The nut is screwed up against the end of the spindle portion and presents an annular shoulder 18 at the end of the spindle.

Encircling the nut 17 is a sleeve 19 which may rotate a limited distance with respect to the nut as will be more fully pointed out hereinafter. The sleeve presents an inwardly directed flange 20 at one end, the inner surface of the flange fitting the spindle 15 so that the nut 17 prevents the sleeve 19 from moving lengthwise in one direction. Rigidly secured to the sleeve is a member 21 which carries the shaft or stem 13. This member may be secured to the sleeve in any suitable manner, but as illustrated the member has a cup-shaped portion of larger diameter than the stem 13 and into which the sleeve 19 is threaded. As the nut 17 is rigid with the shaft 12 and as the sleeve 19 is rigid with the crank 10 it is evident that by locking the sleeve and nut against relative rotation the shaft may be rotated by the turning of the crank. For effecting this locking I form the sleeve 19 with a plurality of radial passages 22 within each of which there is mounted a locking member which in the specific form illustrated is a ball 23. These balls are of a diameter greater than the thickness of the wall of the sleeve 19 and normally project inwardly from the inner surface of the sleeve into pockets 24 formed in the peripheral surface of the nut 17. It is thus evident that if these balls be prevented from moving outward radially, a rotation of the sleeve 19 will insure a similar and equal rotation of the nut 17.

For normally preventing the outward movement of the balls, I encircle the sleeve 19 by an outer sleeve 25 normally rotating with the sleeve 19, but having limited lost motion in respect thereto. Any suitable connection between the sleeve 19 and the sleeve 21 may be employed for controlling this lost motion, but as illustrated, I employ a pin 26 extending inwardly through the member 21 into a curved slot 27 in the end of the sleeve 25. In cranking the engine the sleeve 19 is rotated clockwise from the position indicated in Fig. 3, and the pin 26, which is rigid with the sleeve 19 will engage in the end of the slot as shown in Fig. 3 and cause similar rotation of the sleeve 25. If, during the cranking of the engine, a kick-back should occur, or the charge be ignited before the piston completes the compression stroke and the engine suddenly starts backward from the premature explosion of the charge, it is desired to liberate the sleeve 19 from the nut 17 and permit the free rotation of the nut. To do this, I permit the balls 23 to move outward radially from the pockets in the nut. To permit radial movement of the balls, I provide the sleeve 25 with a series of pockets or sockets 28, so positioned that when the pin 26 is at the end of the slot, shown in Fig. 3, the balls cannot enter these pockets, but upon a relative rotation of the sleeves 19 and 25, to bring the pin to the opposite end of the slot, the balls 23 may move outward radially into the pockets 28 and out of the pockets 24. Upon the first impulse of the engine after the premature explosion the sleeve 19 will start rotating in the reverse direction along with the nut 17. One of the main features of my invention is the means which I employ for preventing the sleeve 25 from rotating with the sleeve 19 in the reverse direction so that the pin 26 can move to the opposite end of its slot and the balls may move outwardly into their outer pockets. As shown, this means includes a member 29 having a collar 30 loose on the spindle 15. This collar 30 extends into the sleeve 25 and is provided with a series of pockets 31 within which there are mounted balls 32. Each of these pockets decrease in depth toward one end and a spring 33 tends to press each ball toward the smaller end of its pocket so as to wedge the ball between the wall of the pocket and the circumferential sleeve 25. The pockets face in such a direction that the sleeve 25 may freely rotate in one direction during the cranking of the engine, but in case the sleeve starts rotating in the reverse direction, the balls 32 will travel outwardly and wedge in place so as to lock the collar 30 and the sleeve 25 together. The member 29 and its collar 30 may be prevented from rotating in any suitable manner. As shown the member has a crank arm or extension at the outer end of which is an opening to receive a stay rod 34. This rod may be suitably attached to the frame of the engine or to the chassis or to any other part of the automobile. As shown, the member 29 may move in the direction of the axis of the shaft 12 in respect to the stay-rod. This is to permit the longitudinal movement of the shaft 12 to bring the self-releasing clutch, not shown, into operation.

Encircling the sleeve 25 is a steel band 35 provided with an inner frictional lining 36 of leather or any suitable material. The ends of the band are connected together by a suitable bolt 37 by means of which the band may be clamped to grip the sleeve 25 more or less tightly. The ends of the band are disposed upon opposite sides of a pin 38 projecting outwardly from the member 11 so as to prevent the band from rotating in either direction with the sleeve 25. This band retards the sleeve 25 and insures the balls 32 coming into locking operation instantly upon the rotation of the sleeve 19 in the reverse direction.

It is thought the operation of my improved device will be clear from the above description, but it may be briefly stated as follows: In cranking, the engine crank 10 is turned so as to rotate the sleeve 19 in a clockwise direction from Fig. 3. The pin 26 causes the sleeve 25 to rotate and the latter turns within the friction band 35 and keeps the balls 32 against their respective springs 33. In case of back fire the shaft 12 and the nut 17 start rotating in the reverse direction and carry with them the sleeve 19 and the crank for a very limited distance. The sleeve 25 is held against reverse rotation, not only by immediate locking action of the balls 32, but also by the action of the friction band. As soon as the sleeve 19 is rotated to such an extent that the balls 23 may enter the pockets 28, the nut 17 is released as shown in Fig. 4 and may freely rotate together with the shaft 12 without rotating the crank. Upon stopping the engine the simple act of turning the crank 10 in the proper direction to crank the engine will bring the parts back into the position shown in Fig. 3.

It will be noted that the entire device is very compact and that all of the working parts are concealed and protected from accidental injury or displacement. The entire device may be readily sold as an article of manufacture and attached to the car without dismantling the latter and without requiring any complicated tools or high grade of mechanical skill. It is only necessary to remove the crank 10 from the shaft and insert the connection in between. If while on the road any part of my improved device should break, the entire device may be easily removed, the crank 10 directly secured to the shaft 12, and the engine started in the same manner as though my improved device had never been attached thereto.

Having thus described my invention what I claim as new and desire to secure by Letters Patent of the United States is:

1. In an engine starter, the combination with a shaft adapted to be rotated in one direction to start the engine and a crank having a socket, of means for preventing back firing action including an intermediate coupling having a member presenting a socket similar to the socket in the crank and receiving said shaft, a member presenting a stud similar to the end of the shaft and disposed within the socket of said crank, interlocking connections between said members for rotating the former in one direction by the latter and means for releasing said connection upon the rotating of the latter in the reverse direction by the former, said crank socket being adapted to be directly applied to said shaft upon the removal of said coupling.

2. In an engine starter the combination with a shaft and a crank adapted to be directly applied to the shaft to rotate the latter and start the engine, an intermediate coupling adapted for insertion between said shaft and said crank upon the removal of the crank from the shaft and preventing reverse rotation of the crank upon a back firing of the engine, said coupling including a member adapted for direct attachment to said shaft, a member adapted for direct attachment to said crank and interlocking connections between said members for permitting the first-mentioned member to be rotated in one direction by the second-mentioned member and operating to automatically release upon the rotation of the second-mentioned member in the reverse direction by the first-mentioned member.

3. In an engine starter, the combination with a spindle, adapted to be operatively connected to the engine shaft and presenting an outer threaded end of reduced diameter, a nut on said end of larger diameter than said spindle and presenting a shoulder at the end of said spindle, a sleeve encircling said nut and having an inwardly directed flange encircling the spindle and engaging with said shoulder, means for connecting a crank to said sleeve and detachably interlocking connections between said nut and said sleeve.

4. In an engine starter the combination with a spindle adapted to be operatively connected to the engine shaft and presenting an outer threaded end of reduced diameter, a nut on said end of larger diameter than said spindle and presenting a shoulder, a non-rotatable member encircling said spindle, a sleeve encircling said nut and having an inwardly directed flange encircling the spindle between said member and said shoulder, whereby the nut retains said sleeve and said member in position, means for connecting the crank to said sleeve, and detachable interlocking connections between said nut and said sleeve and means controlled by said non-rotatable member for controlling said interlocking connections.

5. In an engine starter, the combination of a spindle adapted to be operatively connected to the engine shaft, a non-rotatable member encircling said spindle, a sleeve encircling said spindle and having releasable interlocking connections therewith and serving to retain said non-rotatable member in position, a second sleeve rotatable with the first-mentioned sleeve and encircling the same and encircling said non-rotatable member and having lost motion connections with said first-mentioned sleeve and locking means encircling said second-mentioned sleeve and connecting said non-rotatable member and said second-mentioned sleeve for preventing a rotation of said second-mentioned sleeve in one direction, said second-mentioned sleeve serving to control the interlocking connections between the spindle and the first-mentioned sleeve.

6. In an engine starter, the combination with a spindle adapted to be operatively connected to the engine shaft and presenting an outer threaded end of reduced diameter, a nut on said end of larger diameter than said spindle, a sleeve encircling said nut and having detachable interlocking engagement therewith, a handle connected to said sleeve, a non-rotatable member encircling said spindle and having an exterior diameter substantially equal to the exterior diameter of said sleeve and a second sleeve encircling said first mentioned sleeve and said member and having lost motion connections with said first mentioned sleeve, and interlocking connections with said member.

In testimony whereof I have signed my name to this specification in the presence of two subscribing witnesses.

ERNST A. BOSTROM.

Witnesses:
CLEMENT C. CARY,
A. J. MAYFIELD.